United States Patent
Miller et al.

(10) Patent No.: US 7,489,723 B2
(45) Date of Patent: Feb. 10, 2009

(54) SYSTEM AND METHOD FOR ADJUSTING ACQUISITION PHASE

(75) Inventors: Timothy R. Miller, Arlington, VA (US); Adrian R. Macias, Vista, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 658 days.

(21) Appl. No.: 11/194,755

(22) Filed: Aug. 2, 2005
(Under 37 CFR 1.47)

(65) Prior Publication Data
US 2007/0030884 A1  Feb. 8, 2007

(51) Int. Cl.
*H04B 1/00* (2006.01)
(52) U.S. Cl. ...................... 375/152; 375/316
(58) Field of Classification Search .......... 375/152, 375/137, 134, 130, 316
See application file for complete search history.

(56) References Cited

U.S. PATENT DOCUMENTS

| 6,879,627 B1* | 4/2005 | Davidson et al. ............ 375/222 |
| 2003/0067963 A1 | 4/2003 | Miller et al. |
| 2004/0048595 A1 | 3/2004 | Miller et al. |

OTHER PUBLICATIONS

International Search Report from corresponding PCT application dated Aug. 30, 2007.

* cited by examiner

*Primary Examiner*—Temesgh Ghebretinsae
(74) *Attorney, Agent, or Firm*—Posz Law Group, PLC (57) ABSTRACT

A method (800) is provided of processing a wireless signal (105) at a receiving device (125). The method includes: receiving the wireless signal at the receiving device; performing an acquisition process (820, 830) to determine a phase estimate for the wireless signal; adjusting the phase estimate by a correction value (840) after performing the acquisition process; and performing a tracking process (860) to maintain accuracy in the phase estimate, after adjusting the phase estimate.

20 Claims, 5 Drawing Sheets

SYSTEM AND METHOD FOR ADJUSTING ACQUISITION PHASE

FIELD OF THE INVENTION

The present invention relates in general to the operation of a wired or wireless network, and more particularly to a method of a receiver device to more accurately determine the phase of an incoming signal.

BACKGROUND OF THE INVENTION

In any network in which individual devices operate using their own clock, signals from each of the devices can have different operating phases. Because of small variations in clock frequencies of each device, variations in start phases for the clocks in each device, and a variable propagation distance for any given signal, an incoming signal will have an indeterminate phase from the point of view of the receiving device. It is therefore necessary for any receiver device to first identify the phase of an incoming signal before it can be properly processed.

One way to achieve this phase identification is to have the transmitting device begin a transmission by sending a known data pattern (e.g., a preamble) that has a good autocorrelation property. The receiving device can then create a local copy of the known sequence at a known phase and correlate it with the incoming signal. The receiving device can then step through some or all of the full three hundred and sixty degrees of possible phase for the local signal (in known phase steps), calculating correlation functions between the incoming signal and the local signal for each separate local signal phase. A point with a sufficiently high correlation value will indicate that the local signal is sufficiently close in phase to that of the incoming signal to allow proper processing.

In a multipath environment there may be multiple copies of the same incoming signal, each potentially at a slightly different phase. In this case there will be multiple "acceptable" local phases corresponding to multiple strong copies of the incoming signal. The receiving device must then choose one of these as an operating phase for its local clock when processing the associated incoming signal.

Alternate embodiments could use multiple receiving arms in this case, allowing a receiving device to process signals over multiple incoming signal paths. In this case, the receiving device must determine an operating phase for each of the signals being processed by each of the receiving arms.

However, because of the realities of device operation, there will be a delay between when the receiving device determines an acceptable local phase for processing an incoming signal and when it can instruct its local clock to stop varying the local phase. This delay may cause the local clock to settle on a phase that is one or more phase steps removed from the actual best phase. It would be desirable to eliminate this unwanted phase error.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Wireless Network

Figure 1:
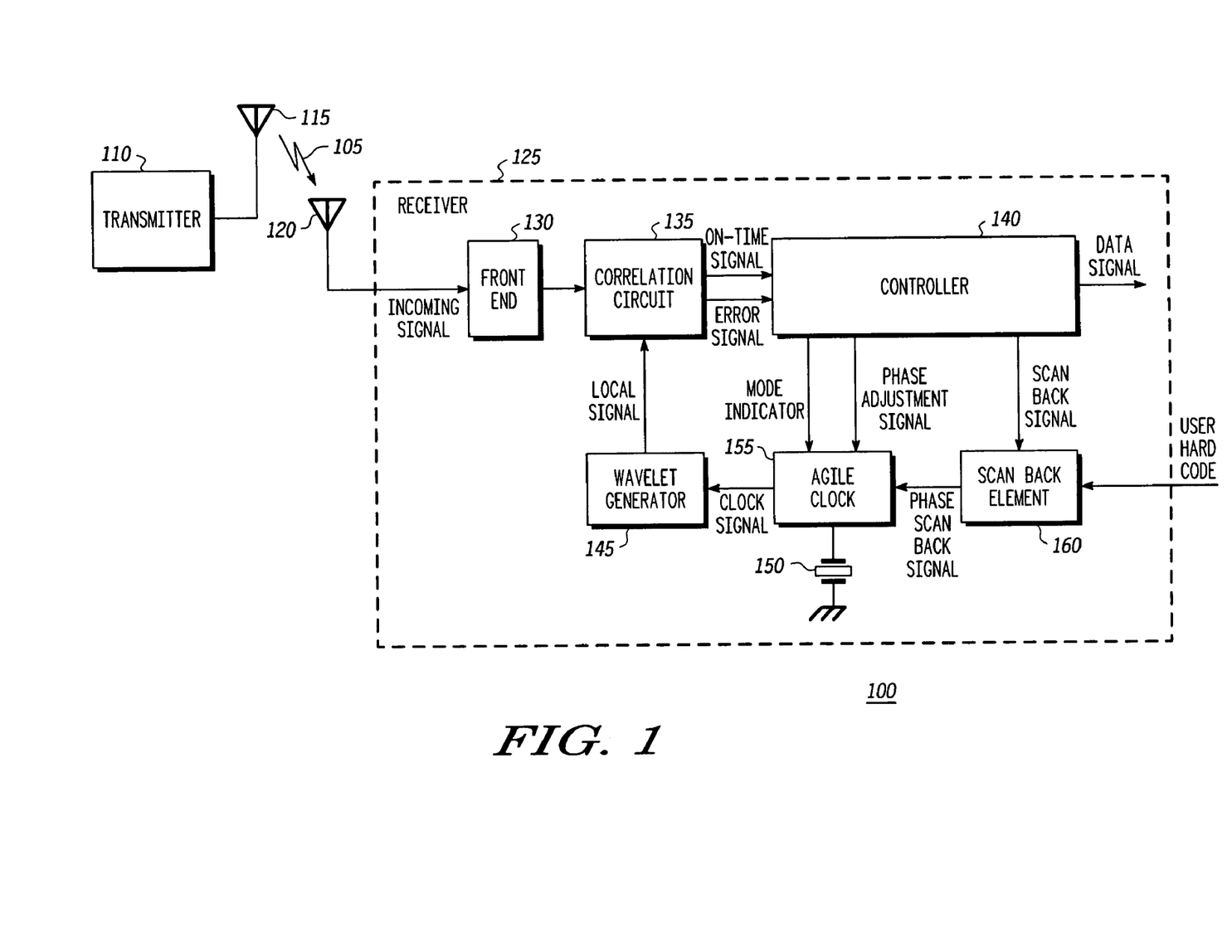
FIG. 1 is a block diagram of a transmitter-receiver device pair, according to a disclosed embodiment of the present invention.

FIG. 1 is a block diagram of a transmitter-receiver device pair, according to a disclosed embodiment of the present invention. As shown in FIG. 1, the system includes a transmitter 110 having a transmitter antenna 115, and a receiver 125 having a receiver antenna 120. The receiver 125 further includes a front end 130, a correlation circuit 135, a controller 140, a wavelet generator 145, a local reference clock 150, an agile clock 155, and a scan back element 160.

In operation, the transmitter 110 sends a wireless signal 105 over a wireless channel via the transmitter antenna 115, and the receiver 125 receives the wireless signal 105 via the receiver antenna 120.

In the receiver 125, the front end 130 receives an incoming signal from the receiver antenna 120 and performs desired front end operations on the signal. This can include spectral shaping, filtering, gain adjustment, equalization, or the like.

The correlation circuit 135 correlates the incoming signal with a locally-generated signal provided by the wavelet generator 145 to provide a data signal and an error signal. The data signal can be provided by correlating an on-time version of the local signal with the incoming signal, while the error signal can be provided by calculating the difference between an early version of the local signal correlated with the incoming signal and a late version of the local signal correlated with the incoming signal. Equivalently, the error signal can be generated by mixing the incoming signal with a local oscillator signal that is ninety degrees out of phase with the incoming signal. The resulting quadrature (Q) term can be used as the error signal, with the in-phase (I) term being used as the data signal.

The controller 140 receives the data signal and the error signal and uses them to provide a mode indicator and a phase adjustment signal to the agile clock 155, as well as a scan back signal to the scan back element 160. The phase adjustment signal can be one signal that indicates an immediate change of phase, or could include multiple signals describing phase changes over varying periods of time.

The wavelet generator 145 generates a local signal of known parameters. During an acquisition process the local signal can be a known wavelet pattern that corresponds to the wavelet pattern in the incoming signal. During a tracking process the local signal can be a wavelet pattern corresponding to a code word used by the transmitter and receiver for passing data. This local signal will be generated based on a local clock signal received from the agile clock 155, and will have a phase related to that of the local clock signal.

In various embodiments different delayed versions of the local signal can be used for acquisition, processing, and tracking. In one particular embodiment the local signal can be delayed twice to create an early copy of the local signal (undelayed), an on-time copy of the local signal (delayed once), and a late copy of the local signal. Because of the delays, each will have a slightly different phase. This operation could be done in the correlation circuit 135 or in the wavelet generator 145. In the latter case, three copies of the local signal would be sent to the correlation circuit 135.

When early, on-time, and late copies of the local signal are used, the copy of the local signal sent from the wavelet generator 145 to the correlation circuit 135 would be the early copy of the local signal, and a once-delayed copy of the local signal would be the on-time signal used for data processing and acquisition. However, for ease of disclosure, the term "local signal" will be used to refer to the on-time copy of the local signal, and any early or late copies of the local signal will be referred to by name. It should be understood that in various embodiments the particular methods of generating multiple phase-shifted copies of the local signal can be achieved in a variety of ways.

In embodiments that use in-phase (I) and quadrature (Q) signals for acquisition, the local signal generated by the wavelet generator 145 can actually be an I-Q signal pair sent to the correlation circuit 135.

Furthermore, regardless of how an on-time copy of the local signal is generated, the controller 140 will still identify at what point the agile clock 155 should stop shifting its phase, and the phase at the stopping point is the desired phase for data reception.

The local reference clock 150 provides a reference clock signal of a known frequency to the agile clock 155. In a disclosed embodiment the local reference clock is a crystal clock of 25 MHz using a phase locked loop (PLL) to raise the frequency to 1.35 GHz, though this can vary in alternate embodiments.

The agile clock 155 receives the reference clock signal from the local reference clock 150 and adjusts its phase and frequency based on the mode indicator and the phase adjustment signal received from the controller. If the mode indicator indicates an acquisition mode, the agile clock 155 periodically varies the phase of the clock signal by a set amount, ultimately rotating the clock signal through the entire three hundred and sixty possible degrees of phase. If the mode indicator indicates a tracking mode, the agile clock 155 essentially maintains its current phase, varying only as instructed by the phase adjustment signal.

The scan back element 160 operates in response to the scan back signal and provides a phase jump back signal to the agile clock 155 instructing it to jump its current output clock signal back by a set scan back phase increment. In alternate embodiments the scan back element could provide a series of small phase correction increments so that the agile clock slowly modified its output clock signal in the smaller increments until it had rolled back the entire phase increment. This would allow for a smoother phase correction and can avoid problems with the operation of the agile clock such as edge glitches.

The scan back element could store the scan back phase increment (and any required phase correction increments) in a register, a random access memory, a read-only memory, or the like.

The scan back element 160 can have the scan back phase increment entered in by user hard code. However, in some embodiments the receiver 125 may dynamically update the scan back phase increment during operation.

Figure 2:
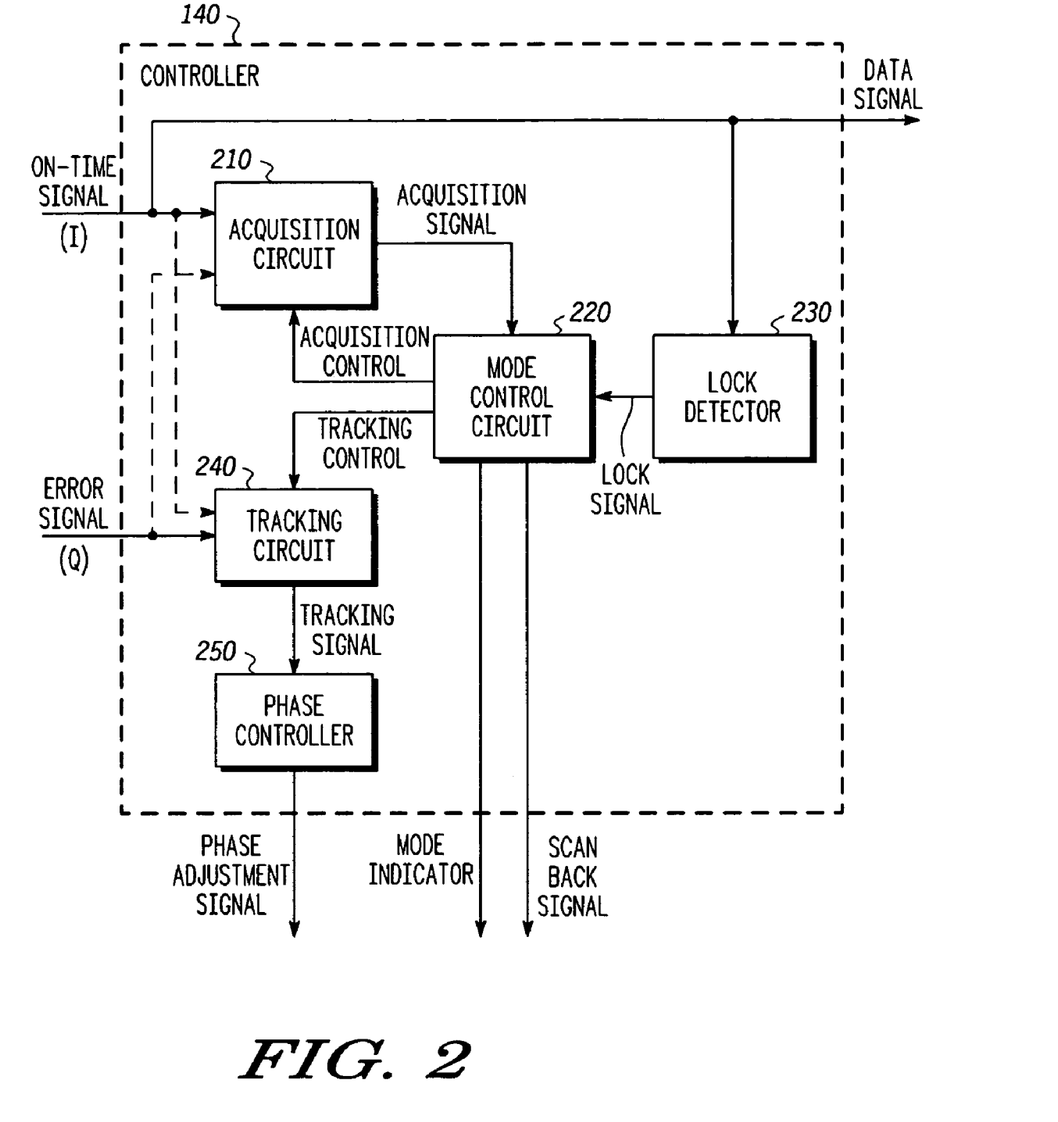
FIG. 2 is a block diagram of the controller of FIG. 1, according to a disclosed embodiment of the present invention.

FIG. 2 is a block diagram of the controller of FIG. 1, according to a disclosed embodiment of the present invention. As shown in FIG. 2, the controller 140 includes an acquisition circuit 210, a mode control circuit 220, a lock detector 230, a tracking circuit 240, and a phase controller 250.

The acquisition circuit 210 receives an on-time signal from the correlation circuit and uses this value to determine whether the receiver 125 has successfully acquired an incoming signal. This data signal may be prepared by having the correlation circuit 135 correlate the incoming signal with a local signal that is identical to a known portion of an incoming signal (e.g., part of a preamble). The acquisition circuit 210 can then look for when the resulting data signal crosses a set magnitude threshold. This will happen when the phase of the local signal (determined by the phase of the local clock signal from the agile clock 155) is identical or nearly identical to the phase of the incoming signal. Exactly how much the two phases can differ will depend upon the threshold chosen.

In some embodiments the acquisition circuit 210 can also receive the error signal from the correlation circuit 135. By treating the on-time and error signals as in-phase (I) and quadrature (Q) components, respectively, the acquisition circuit could detect the envelope of the transmitted signal.

When the acquisition circuit 210 determines that the receiver 125 has acquired the incoming signal, it provides an acquisition signal to the mode control circuit 220 indicating this fact.

The acquisition circuit 210 operates in response to an acquisition control signal from the mode control circuit 220. When the acquisition control signal indicates that the receiver 125 is in an acquisition mode, the acquisition circuit 210 will perform its acquisition function. And when the acquisition control signal indicates that the receiver 125 is no longer in acquisition mode (i.e., it's in a tracking mode), the acquisition circuit 210 will stop performing the acquisition function.

The mode control circuit 220 operates to control the mode in which the receiver 125 is operating in, i.e., acquisition when it is trying to acquire the phase of a new incoming signal, and tracking after the initial phase has been acquired and when it is trying to maintain that acquired phase. The mode control circuit 220 receives an acquisition signal from the acquisition circuit 210 and a lock signal from the lock detector 230. Based on these signals it provides an acquisition control signal to the acquisition circuit 210, a tracking control signal to the tracking circuit 240, a mode indicator to the agile clock 155, and a scan back signal to the scan back element 160.

The mode control circuit 220 will start operation by having the receiver 125 in an acquisition mode. It will instruct the acquisition circuit 210, the tracking circuit 240, and the agile clock 155 of this fact through its various output signals.

Then, when it receives an acquisition signal indicating that the acquisition circuit 210 has successfully acquired the incoming signal, the mode control circuit will have the receiver 125 enter a tracking mode. It will so instruct the acquisition circuit 210, the tracking circuit 240, and the agile clock 155 through its various output signals.

Once in the tracking mode, the mode control circuit 220 will begin monitoring the lock signal. When the lock signal indicates that the receiver 125 has lost its lock on the incoming signal, the mode control circuit 220 will return to an acquisition mode and will instruct the acquisition circuit 210, the tracking circuit 240, and the agile clock 155 of this fact through its various output signals.

The lock detector 230 receives the data signal from the correlation circuit and determines when the value of the correlation result (i.e., the data signal) falls below the set threshold used for acquisition. If the receiver 125 is in a tracking mode, such an occurrence will indicate that the receiver has lost its lock on the incoming signal and must reenter the acquisition mode to recover the phase of the incoming signal. When this happens the lock detector 230 so indicates in the lock signal sent to the mode control circuit 220.

Since in the disclosed embodiment the incoming signal is bi-phase, the acquisition circuit 210 and the lock detector 230 are constructed to monitor the magnitude of the data signal, not necessarily its sign when looking for signal acquisition or signal lock. Thus, it can determine when portions of the correlated signals in both a non-inverted and inverted position are above or below the acquisition threshold, even though the correlation results will themselves be reversed between the non-inverted and inverted portions of the incoming signals.

The tracking circuit 240 receives the error signal from the correlation circuit 135 and the tracking control signal from the mode control circuit 220, and provides a tracking signal to the phase controller 250. The tracking signal tells the phase controller 250 when the phase of the local signal should be increased, when the phase of the local signal should be decreased, and in some implementations how much the increase or decrease should be.

The tracking circuit 240 operates in response to the tracking control signal from the mode control circuit 220. When the tracking control signal indicates that the receiver 125 is in an acquisition mode, the tracking circuit 240 remains dormant. And when the tracking control signal indicates that the receiver 125 is in a tracking mode, the tracking circuit 240 will perform its tracking function.

In some embodiments the acquisition circuit 210 can also receive the on-time signal from the correlation circuit 135. The acquisition circuit 210 can then treat the on-time signal as an in-phase (I) component, and the error signal as a quadrature (Q) component, detecting the envelope of the transmitted signal and using this to derive the error.

The phase controller 250 receives the tracking signal from the tracking circuit 240 and based on this signal generates the phase adjustment signal that is provided to the agile clock 155. In some embodiments a single phase increment is used by the agile clock 155 to alter its phase during a tracking mode. In this case the phase adjustment signal indicates whether the agile clock 155 should keep the phase of the clock signal unchanged, increment the phase of the clock signal by one phase increment, or reduce the phase of the clock signal by one phase increment.

However, in embodiments in which the agile clock 155 uses multiple phase increments to alter its phase during tracking, the phase adjustment signal can indicate whether the agile clock 155 should keep the phase of the clock signal unchanged, increment the phase of the clock signal, or reduce the phase of the clock signal, as well as the size of any phase change.

Acquisition and Tracking Processes

Figure 3:
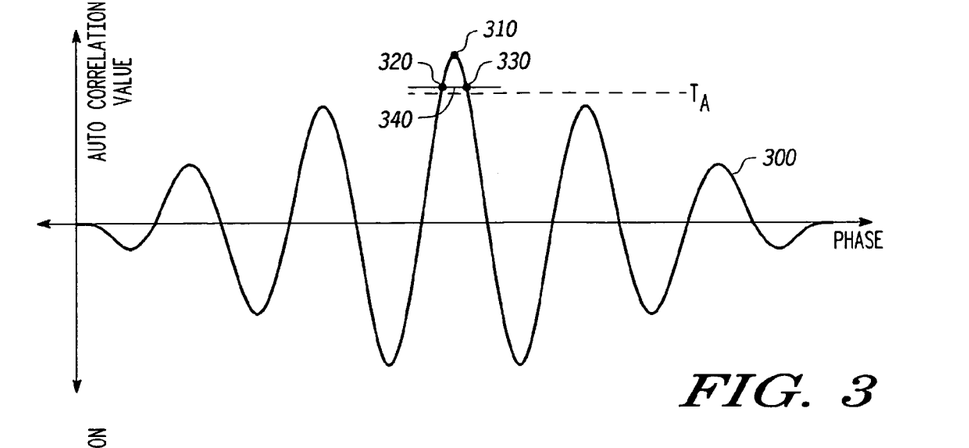
FIGS. 3 through 5 are graphs of an autocorrelation function showing exemplary acquisition and tracking processes, according to a disclosed embodiment of the present invention.
Figure 4:
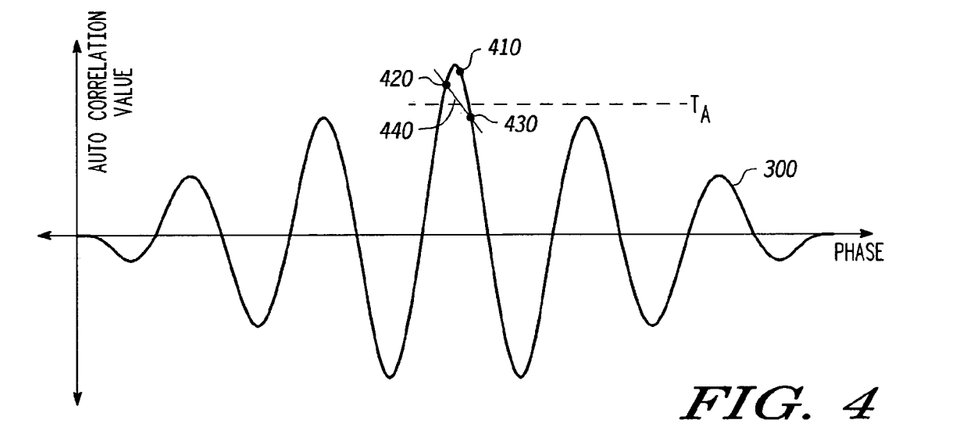
Figure 5:
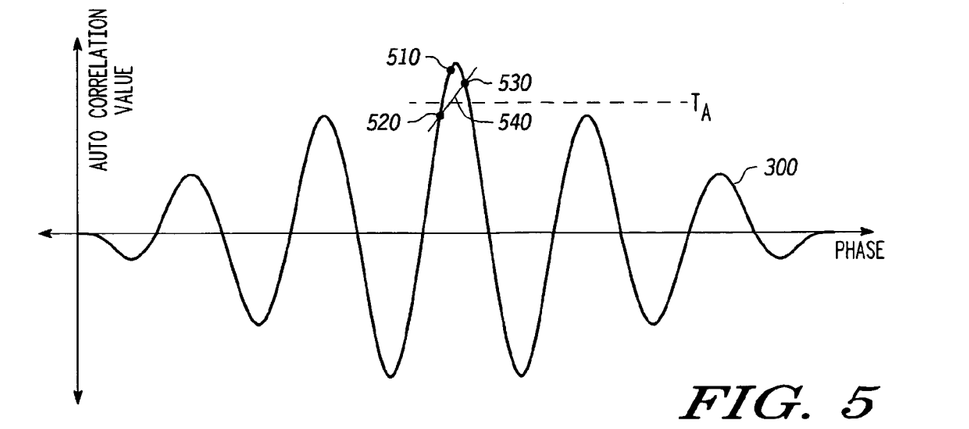

FIGS. 3 through 5 are graphs of an autocorrelation function showing exemplary acquisition and tracking processes, according to a disclosed embodiment of the present invention. These graphs show the values output from the correlation circuit 135 as the data signal and the error signal as a function of the difference between the phase of the incoming signal and the phase of a respective copy of the local signal correlated with the incoming signal. However, since the phase of the incoming signal remains constant, this can be normalized to be indexed by the phase of the local signal.

In each case a data value for the data signal is determined by outputting the autocorrelation value between an on-time version of the local signal and the incoming signal, and the error signal is determined by calculating the slope of a line between a first error component and a second error component. The first error component is the autocorrelation value between an early-phase version of the local signal and the incoming signal, and the second error component is the autocorrelation value between a late-phase version of the local signal and the incoming signal. One way to implement this in the correlation circuit 135 is to have the local signal delayed twice by known delay value. The undelayed local signal can be used as the early-phase version of the local signal; the single-delayed copy of the local signal can be used as the on-time phase version of the local signal; and a twice-delayed copy of the local signal can be used as the late-phase version of the local signal.

As noted above, however, in alternate embodiments an I-Q signal pair could be used for acquisition with the in-phase signal (I) being used as the on-time signal and the quadrature (Q) signal being used as the error signal.

Furthermore, because the on-time signal is a bi-phase signal, with one orientation indicating a digital "1" and an inverse orientation indicating a digital "0," the error signal may be rectified by the sign of the on-time signal. This will ensure that the resulting error signal will be appropriate whether a bit value of "1" or a bit value of "0" is received (i.e., regardless of the orientation of the on-time signal). In alternate embodiments other processes can be used to account for effects of the bi-phase nature of the on-time signal on the error signal. For example, the error signal could be calculated by subtracting the absolute value of the second error component from the absolute value of the first error component and dividing by the signal delay between the early-phase and late-phase versions of the local signal.

In particular, FIG. 3 is an example of when an on-time phase of the local signal is identical to the phase of the incoming signal; FIG. 4 is an example of when an on-time phase of the local signal is slightly lower than the phase of the incoming signal; and FIG. 5 is an example of when an on-time phase of the local signal is slightly higher than the phase of the incoming signal.

In FIGS. 3 through 5 an acquisition threshold $T_A$ is provided for the autocorrelation function. This acquisition threshold $T_A$ allows the acquisition circuit 210 in the controller 140 to determine when acquisition has been successfully achieved. The acquisition threshold $T_A$ is determined by estimating the background noise and setting threshold to ensure a good signal-to-noise ratio (SNR). One way to do this would be to filter the data prior to detection and applying a square absolute value function to it. When the data signal is above the acquisition threshold $T_A$, the phase of the on-time copy of the local signal is sufficiently close to that of the incoming signal for the receiver 125 to successfully process it.

Alternatively, instead of using a set acquisition threshold $T_A$, the system could filter the autocorrelation result and use a different threshold that takes background noise into account. The system could calculate the absolute value or the square of the incoming signal prior to detection or filtering, and use this in conjunction with the filtered result to determine the desired threshold.

As shown in FIG. 3, this embodiment has a data correlation value 310, a first delay correlation value 320, a second delay correlation value 330, and an error line 340 between the first delay correlation value 320 and the second delay correlation value 330. The data correlation value 310 shows the correlation between the on-time copy of the local signal and the incoming signal; the first delay correlation value 320 shows the correlation between the early copy of the local signal and the incoming signal; and the second delay correlation value 330 shows the correlation between the late copy of the local signal and the incoming signal.

The data correlation value 310 in this embodiment is at the highest point on the autocorrelation curve. This will occur when the phase of the on-time copy of the local signal is the same as the phase of the incoming signal. The first error correlation value 320 in this embodiment is to the left of the data correlation value at a point on the autocorrelation curve corresponding to a phase difference resulting from the delay between the early-phase copy of the local signal and the on-time copy of the local signal. Likewise, the second error correlation value 330 in this embodiment is to the right of the data correlation value, at a point on the autocorrelation curve corresponding to a phase difference resulting from the delay between the on-time copy of the local signal and the late-phase copy of the local signal.

Because the data correlation value 310 is at the maximum point on the autocorrelation curve, and because the same delay is used to obtain the early-phase copy of the local signal and the late-phase copy of the local signal, the first error correlation value 320 and the second error correlation value 330 are the same in magnitude, but are located on opposite sides of the data correlation value 310. As a result, the slope of the error line 340 between the first delay correlation value 320 and the second delay correlation value 330 is zero.

As shown in FIG. 4, this embodiment has a data correlation value 410, a first delay correlation value 420, a second delay correlation value 430, and an error line 440 between the first delay correlation value 420 and the second delay correlation value 430. The data correlation value 410 shows the correlation between the on-time copy of the local signal and the incoming signal; the first delay correlation value 420 shows the correlation between the early copy of the local signal and the incoming signal; and the second delay correlation value 430 shows the correlation between the late copy of the local signal and the incoming signal.

The data correlation value 410 in this embodiment is slightly to the right of the highest point on the autocorrelation curve. This will occur when the phase of the on-time copy of the local signal slightly larger than the phase of the incoming signal. The first error correlation value 420 in this embodiment is at a point on the autocorrelation curve corresponding to a phase difference resulting from the delay between the early-phase copy of the local signal and the on-time copy of the local signal. Likewise, the second error correlation value 430 in this embodiment is at a point on the autocorrelation curve corresponding to a phase difference resulting from the delay between the on-time copy of the local signal and the late-phase copy of the local signal.

Because the data correlation value 410 is to the right of the maximum point on the autocorrelation curve, and because the same delay is used to obtain the early-phase copy of the local signal and the late-phase copy of the local signal, the first error correlation value 420 will have a larger magnitude than that of the second error correlation value 430. As a result, the slope of the error line 440 between the first delay correlation value 420 and the second delay correlation value 430 is negative. The magnitude of the slope of the error line 440 will indicate how far the data correlation value 410 is to the right of the maximum point. The greater the slope, the farther the data correlation value 410 is from the maximum point.

As shown in FIG. 5, this embodiment has a data correlation value 510, a first delay correlation value 520, a second delay correlation value 530, and an error line 540 between the first delay correlation value 520 and the second delay correlation value 530. The data correlation value 510 shows the correlation between the on-time copy of the local signal and the incoming signal; the first delay correlation value 520 shows the correlation between the early copy of the local signal and the incoming signal; and the second delay correlation value 530 shows the correlation between the late copy of the local signal and the incoming signal.

The data correlation value 510 in this embodiment is slightly to the left of the highest point on the autocorrelation curve. This will occur when the phase of the on-time copy of the local signal slightly smaller than the phase of the incoming signal. The first error correlation value 520 in this embodiment is at a point on the autocorrelation curve corresponding to a phase difference resulting from the delay between the early-phase copy of the local signal and the on-time copy of the local signal. Likewise, the second error correlation value 530 in this embodiment is at a point on the autocorrelation curve corresponding to a phase difference resulting from the delay between the on-time copy of the local signal and the late-phase copy of the local signal.

Because the data correlation value 510 is to the left of the maximum point on the autocorrelation curve, and because the same delay is used to obtain the early-phase copy of the local signal and the late-phase copy of the local signal, the first error correlation value 520 will have a smaller magnitude than that of the second error correlation value 530. As a result, the slope of the error line 540 between the first delay correlation value 520 and the second delay correlation value 530 is positive. The magnitude of the slope of the error line 540 will indicate how far the data correlation value 510 is to the left of the maximum point. The greater in magnitude the slope, the farther the data correlation value 510 is from the maximum point.

The correlation circuit 135 of FIG. 1 provides a data signal and an error signal. In the disclosed embodiment, the data signal is equal to the value of the data correlation value 310, 410, 510, while the error signal is determined based on the slope of the error line 340, 440, 540. The error signal could simply identify the sign of the slope of the error line 340, 440, 540 (i.e., positive, negative, or zero). Alternatively, the error signal could identify both the sign and magnitude of the slope of the error line 340, 440, 540.

As noted above with respect to FIGS. 1 and 2, the acquisition circuit 210, the lock detector 230, and the tracking circuit 240 use the data signal and the error signal to generate the acquisition signal, the lock signal, and the tracking signal.

The acquisition circuit 210 and the lock detector 230 compare the data signal (or the on-time and error signals) to the acquisition threshold value $T_A$. When the value of the data signal is below the acquisition threshold value $T_A$ the acquisition circuit 210 provides an acquisition signal that indicates no acquisition, and the lock detector 230 provides a lock signal that indicates no signal lock. When the value of the data signal is above the acquisition threshold value $T_A$ the acquisition circuit 210 provides an acquisition signal that indicates successful acquisition, and the lock detector 230 provides a lock signal that indicates continued signal lock.

The tracking circuit 240 examines the error signal (rectified by the sign of the on-time signal) to determine if it is positive, negative, or zero. If the error signal is zero, then the tracking circuit 240 provides a tracking signal that indicates the phase of the local clock signal should remain unchanged. If the error signal is positive, then the tracking circuit 240 provides a tracking signal that indicates the phase of the local clock signal should be increased. And if the error signal is negative, then the tracking circuit 240 provides a tracking signal that indicates the phase of the local clock signal should be decreased. If the error signal includes magnitude information this can be used by the tracking circuit 240 to provide information in the tracking signal regarding how much the phase of the local clock signal should be changed.

It should be noted, however, that in alternate embodiments where the error signal is not rectified by the sign of the on-time signal the sign of the error signal may be inverted for one type of data value, in which case the processing of the error signal should be modified accordingly to account for this sign inversion.

As noted above, the receiver 125 begins in an acquisition mode. Then, when the acquisition circuit 210 determines that the signal is above the acquisition threshold $T_A$, it sets the acquisition signal to notify the mode control circuit 220 that the incoming signal has been successfully acquired. The mode control circuit then sets the mode control indicator to indicate to the agile clock 155 that the receiver 125 is transitioning from the acquisition mode to the tracking mode. The agile clock 155 responds to the mode control indicator by stopping its constant alteration of the phase of the clock signal and settling to the current phase, as adjusted according to the phase adjustment signal.

However, there is a propagation delay in identifying in the acquisition circuit 210 that the signal or filtered signal is above the acquisition threshold $T_A$, sending the acquisition signal to the mode control circuit 220, sending the mode indicator to the agile clock, and stopping the constant phase alterations in the agile clock 155. As a result of this, the phase of the clock signal may go through one or more of the acquisition mode phase changes after the proper phase is achieved but before the agile clock is instructed to stop varying the phase. This can cause a drop in performance, and can even cause the phase of the clock signal to change so much that the data signal actually drops below the acquisition threshold $T_A$, causing an immediate loss of signal lock.

One way to avoid this problem is to estimate the expected propagation delay for instructions to reach the agile clock 155 after the proper acquisition phase has been set, calculate the corresponding amount of improper phase change provided by the agile clock 155 during that propagation delay (i.e., the amount of phase offset experienced), and cause the agile clock 155 to step its phase back by the phase offset upon receiving an indication of a change from acquisition mode to tracking mode. This will account for the phase error caused by the propagation delay and will bring the phase of the clock signal back to where it should be for successful signal processing.

Phase Adjustment During Acquisition

Figure 6:
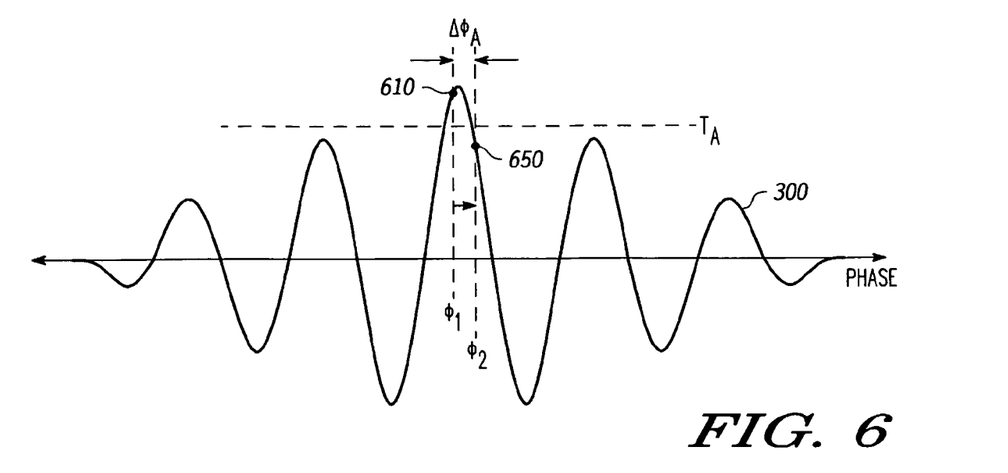
FIGS. 6 and 7 are graphs of an autocorrelation function showing exemplary phase adjusting process during an acquisition processes, according to a disclosed embodiment of the present invention.
Figure 7:
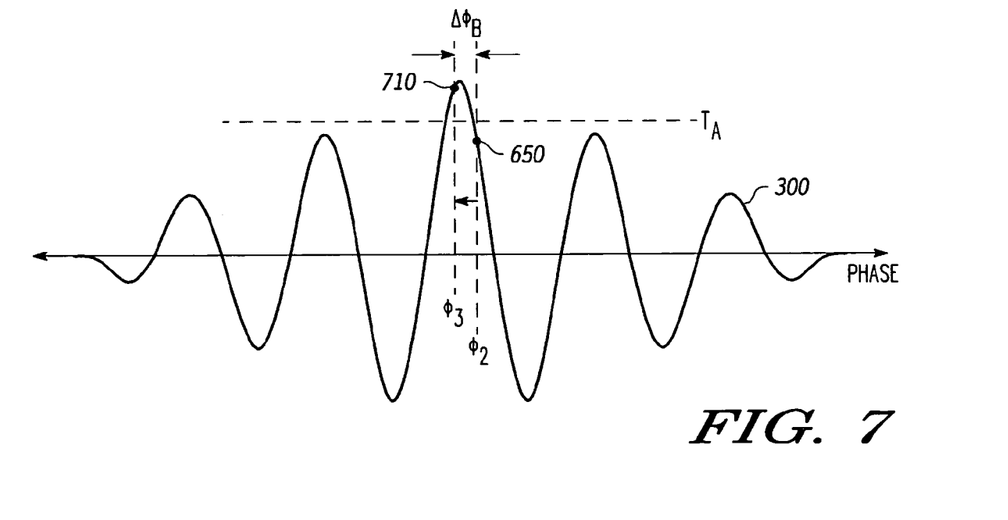

FIGS. 6 and 7 are graphs of an autocorrelation function showing exemplary phase adjusting process during an acquisition processes, according to a disclosed embodiment of the present invention. These graphs show the values output of the data signal from the correlation circuit 135 as a function of the difference between the phase of the incoming signal and the phase of the local signal. However, since the phase of the incoming signal remains constant, this can be normalized to be indexed by the phase of the local signal.

FIG. 6 illustrates what happens when the phase of the clock signal output from the agile clock 155 slips owing to the propagation delay of the notification of the mode change from the acquisition circuit 210 to the agile clock 155. FIG. 7 illustrates what happens when the phase of the clock signal output from the agile clock 145 is scanned back in phase to correct for this propagation delay.

As shown in FIG. 6, the acquisition circuit 210 determines that acquisition has occurred when the magnitude of the correlation of the incoming signal with the local signal rises above the acquisition threshold $T_A$. In the embodiment show in FIG. 6, this occurs at an actual acquisition correlation point 610, which corresponds to an actual acquisition phase $\phi_1$ for the local clock signal output form the agile clock 155 (which also corresponds to the phase of the local signal output from the wavelet generator 145, since the phase of the local signal and the local clock signal are related). Acquisition occurs because the value at the actual acquisition correlation point 610 is above the acquisition threshold $T_A$.

However, as noted above, there is an actual acquisition mode change delay $\Delta\phi_A$ between when the wavelet generator 145 provides a local signal of the actual acquisition phase $\phi_1$, and when the agile clock 155 receives a mode indicator signal that instructs it to stop varying the phase of the clock signal. This may cause the agile clock to alter the phase of the local clock one or more times beyond the actual acquisition phase $\phi_1$. As a result of this, once the agile clock 155 exits the acquisition mode, the receiver 125 actually operates at a delayed correlation point 650, which corresponds to a delayed phase $\phi_2$ for the local clock signal output from the agile clock 155. In some cases this delayed correlation point 650 can actually be below the acquisition threshold $T_A$, causing the lock detector 230 to immediately indicate that the receiver 125 has lost its signal lock, forcing the receiver 125 to reenter acquisition mode, or the phase error can be large enough to prevent the tracking circuit from operating properly, which will in turn result in a loss of signal lock.

Therefore, when the mode control circuit 220 sends a mode indicator to the agile clock, instructing it to move from acquisition mode to tracking mode, it also sends a scan back signal to the scan back element 160 instructing it to issue a phase scan back signal or signals to the agile clock.

The phase scan back signal or signals will cause the agile clock 155 to move the phase of the clock signal back by a set scan back phase, as shown in FIG. 7. This scan back phase is an estimated acquisition mode change delay $\Delta\phi_B$, which estimates the phase delay between when the wavelet generator 145 provides a local signal of the actual acquisition phase $\phi_1$, and when the agile clock 155 receives a mode indicator signal that instructs it to stop varying the phase of the local clock signal. This brings the phase of the local clock signal back to an estimated acquisition phase $\phi_3$, which should roughly correspond to the actual acquisition phase $\phi_1$, and causes the data signal to operate an estimated acquisition correlation point 710, which corresponds to the estimated acquisition phase $\phi_3$.

As noted above, the scan back process can be implemented all at once in a single jump back, or in smaller steps over a short time, depending upon the particular embodiment used.

The actual acquisition mode change delay $\Delta\phi_A$ is a function of the pipeline delay in the various registers that make up the correlation circuit 135, the acquisition circuit 210, the mode control circuit 220, and the agile clock 155, the filter delay of any filter used in the processing path (e.g., an infinite impulse response filter), and possibly other acquisition parameters such as the acquisition threshold $T_A$ used.

The estimated acquisition mode change delay $\Delta\phi_B$ that is used for determining the phase scan back value can be determined by simulation and testing. The pipeline delays should be a known value, while the filter delays can be simulated by computer model. Other values can be estimated and iteratively tested to determine their accuracy.

In some alternate embodiments the phase scan back value (i.e., the estimated acquisition mode change delay $\Delta\phi_B$) can be adaptively determined in real time. For example, the receiver 125 could periodically vary the phase scan back value up or down until either the packet error rate of the incoming signal was minimized or the throughput was maximized. The new value for the phase scan back could then replace the old one in the scan back element 160.

A typical step back value in the disclosed embodiment would be 18 picoseconds performed in six 3-picosecond steps. However this could vary in alternate embodiments, being lower or larger. In some embodiments the steps could be considerably larger.

Figure 8:
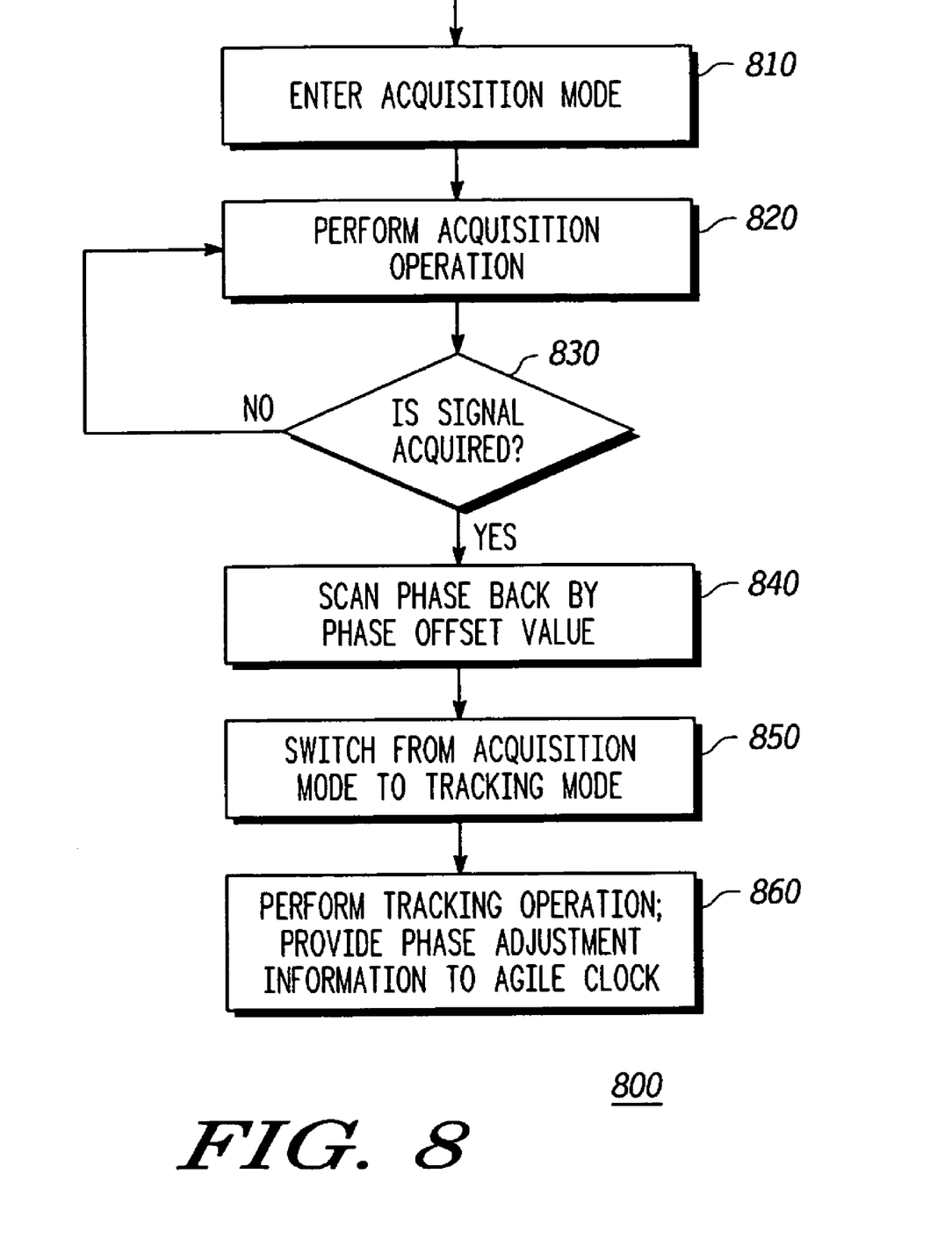
FIG. 8 is a flow chart of the operation of a receiver device in performing an acquisition process, according to a disclosed embodiment of the present invention.

FIG. 8 is a flow chart of the operation of a receiver device in performing an acquisition process, according to a disclosed embodiment of the present invention.

As shown in FIG. 8, the receiver 125 begins its general operation by entering into an acquisition mode. (810) At this point the receiver 125 is receiving an incoming signal from the transmitter 110, but has not determined the phase of the incoming signal.

Once in the acquisition mode, the receiver 125 then performs the acquisition operation. (820) As described above, in one embodiment this involves correlating the incoming signal with locally generated copy of a known sequence contained in the incoming signal, systematically changing the phase of the local signal, and looking for a correlation result that exceeds a given acquisition threshold $T_A$.

As the acquisition operation is performed (820), the receiver 125 periodically determines whether the incoming signal has been acquired. (830) In other words, it determines whether the receiver 125 has determined the phase of the incoming signal within an acceptable variation and has set its local clock signal to that phase.

If the receiver 125 has not acquired the incoming signal then processing continues with the acquisition operation. (820) If, however, the receiver does acquire the signal then the receiver 125 scans back the phase of the local clock signal by a scan back phase offset value. (840) This can be done all at once by jumping the phase back or in small increments by rolling the phase back. As noted above, the scan back phase offset value serves to account for various delays the receiver suffers when it operates to stop varying the phase of its local clock signal at the end of the acquisition process.

Once the adjusted acquisition phase is set, the receiver 125 will switch from the acquisition mode to the tracking mode. (850)

The receiver 125 will then begin performing the tracking operation, providing periodic phase adjustment information to the agile clock based on error information derived from the incoming signal and the locally generated signal. (860)

If at any time the receiver 125 loses its acquisition lock for any reason, it can always return to the acquisition mode (810) and begin processing again.

Conclusion

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method of processing a wireless signal at a receiving device, comprising:
   receiving the wireless signal at the receiving device;
   performing an acquisition process to determine a phase estimate for the wireless signal;
   adjusting the phase estimate by a correction value after performing the acquisition process; and
   performing a tracking process to maintain accuracy in the phase estimate, after adjusting the phase estimate.

2. A method of processing a wireless signal at a receiving device, as recited in claim 1, wherein the phase estimate is used by an agile clock to generate a local clock signal matched closely in phase to the wireless signal.

3. A method of processing a wireless signal at a receiving device, as recited in claim 1, further comprising calculating the correction value is stored in one of: a register, a random access memory, and a read only memory.

4. A method of processing a wireless signal at a receiving device, as recited in claim 1, further comprising calculating the correction value prior to the adjusting of the phase estimate by a correction value after performing the acquisition process.

5. A method of processing a wireless signal at a receiving device, as recited in claim 1, wherein the correction value is changed over time.

6. A method of processing a wireless signal at a receiving device, as recited in claim 1, wherein the correction value is determined based on a pipeline delay of an input pipeline that the wireless signal is processed in.

7. A method of processing a wireless signal at a receiving device, as recited in claim 1,
   wherein performing the acquisition process further comprises filtering the wireless signal through an infinite input response filter, and wherein the correction value is determined based on at least one of: a filter delay in the infinite input response filter, and a shape of the infinite input response filter.

8. A method of processing a wireless signal at a receiving device, as recited in claim 1,
wherein performing the acquisition process further comprises filtering the wireless signal through a finite input response filter, and
wherein the correction value is determined based on at least one of: a filter delay in the finite input response filter, and a shape of the finite input response filter.

9. A method of processing a wireless signal at a receiving device, as recited in claim 1, wherein the adjusting of the phase estimate by the correction value is performed by repeatedly reducing the phase estimate by a fraction of the correction value until the phase estimate is reduced by the entire correction value.

10. A method of processing a wireless signal at a receiving device, as recited in claim 1, wherein the receiving device is an ultra wideband device.

11. A method of processing a wireless signal at a receiving device, as recited in claim 1, wherein the method is implemented in an integrated circuit.

12. A wireless receiver, comprising:
a front end for receiving and processing a wireless signal;
an acquisition circuit for performing an acquisition process to determine a phase estimate for the wireless signal;
a correction value element for providing a correction value;
a controller for obtaining the correction value from a storage element and adjusting the phase estimate by the correction value after the acquisition circuit performs the acquisition process; and
a tracking circuit for performing a tracking process to maintain accuracy in the phase estimate.

13. A wireless receiver, as recited in claim 12,
wherein the acquisition circuit further comprises an infinite input response filter, and
wherein the correction value is determined based on at least one of: a filter delay in the infinite input response filter, and a shape of the infinite input response filter.

14. A wireless receiver, as recited in claim 12,
wherein the acquisition circuit further comprises a finite input response filter, and
wherein the correction value is determined based on at least one of: a filter delay in the finite input response filter, and a shape of the finite input response filter.

15. A wireless receiver, as recited in claim 12, further comprising an agile clock that generates a local clock based on the phase estimate.

16. A wireless receiver, as recited in claim 12, wherein the controller comprises the storage element for storing the correction value.

17. A wireless receiver, as recited in claim 16, wherein the storage element is one of: a register, a random access memory, and a read only memory.

18. A wireless receiver, as recited in claim 12, wherein the controller comprises a phase adjustment generation circuit for generating the correction value.

19. A wireless receiver, as recited in claim 12, wherein the wireless receiver is an ultra wideband device.

20. A wireless receiver, as recited in claim 12, wherein the wireless receiver is implemented in an integrated circuit.

* * * * *